(12) United States Patent
Riccardi

(10) Patent No.: US 7,494,239 B2
(45) Date of Patent: Feb. 24, 2009

(54) ATTACHMENT FOR CELL PHONES

(76) Inventor: Michael Riccardi, 292 Linda St., Belford, NJ (US) 07718

( * ) Notice: Subject to any disclaimer, the term of this patent is extended or adjusted under 35 U.S.C. 154(b) by 15 days.

(21) Appl. No.: 11/726,688

(22) Filed: Mar. 22, 2007

(65) Prior Publication Data
US 2008/0232089 A1 Sep. 25, 2008

(51) Int. Cl.
F21V 33/00 (2006.01)
(52) U.S. Cl. ............... 362/109; 7/151; 379/428.04
(58) Field of Classification Search ......... 362/109; 7/151–156; 376/428.04
See application file for complete search history.

(56) References Cited

U.S. PATENT DOCUMENTS

| 4,560,344 A * | 12/1985 | Kietaibl .............. 431/253 |
| 4,569,653 A * | 2/1986 | Becker et al. .......... 431/253 |
| 4,854,856 A * | 8/1989 | Steiger, Jr. et al. ...... 431/253 |
| 5,531,365 A * | 7/1996 | Donnelly ............. 224/576 |
| 7,195,371 B2 * | 3/2007 | Thuma et al. .......... 362/199 |
| 2002/0048363 A1 * | 4/2002 | Scheller et al. ....... 379/433.11 |
| 2006/0087845 A1 * | 4/2006 | Yeh ..................... 362/253 |
| 2006/0146483 A1 * | 7/2006 | Patino et al. .......... 361/600 |

FOREIGN PATENT DOCUMENTS

| EP | 1030497 A2 * | 8/2000 |
| EP | 1484901 A1 * | 12/2004 |
| WO | WO 2007071176 A1 * | 6/2007 |

* cited by examiner

Primary Examiner—Jong-Suk (James) Lee
Assistant Examiner—Leah S Lovell
(74) Attorney, Agent, or Firm—Robert M. Skolnik

(57) ABSTRACT

An attachment for cell phones contains a light and bottle opener. The attachment may be affixed to or be removably attached to the back of a cell phone and/or to a cell phone case. If removable, the structure attaches to the back of a cell phone or case via VELCRO® fastening. The removable light may be held in place by the bottle opener and/or by walls formed on the plate. In another embodiment, the bottle opener also serves as a spring loaded belt clip.

5 Claims, 2 Drawing Sheets

ATTACHMENT FOR CELL PHONES

FIELD OF THE INVENTION

The present invention is an attachment for cell phones which attachment contains a light and bottle opener. The attachment may be affixed to or be removably attached to the back of a cell phone and/or to a cell phone case. If removable, the structure attaches to the back of a cell phone or case via VELCRO® fastening. The removable light may be held in place by the bottle opener and/or by walls formed on the plate. In another embodiment, the bottle opener also serves as a spring loaded belt clip.

SUMMARY OF THE INVENTION AND DESCRIPTION OF RELATED ART

The present invention enables a cell phone to have additional practical functions for the user, namely a bottle opener and a light. The invention is an attachment onto the back of the phone or cell phone case which carries the opener and the light. The light is removable as well and may be partially held in place by the structure of the bottle opener.

The prior art is represented by the following:

| | |
|---|---|
| 1,516,647 | Saunders |
| 3,370,163 | Brill |
| 4,831,504 | Nishizawa, et al. |
| 5,313,376 | McIntosh |
| 5,442,529 | Hoover |
| 5,829,965 | Rubalcava |
| 6,027,224 | Schnell |

Illuminated Bottle Opener from Nonteen Innovative http://sourcing.tctrade.com/cgi-bin/hkei.dll/Jsp/Hkei/Template_ProductDetail.cmd?.

Swiss Army SwissCard Lite http://nashvilleknifeshop.com/viswarswlion.html.

Saunders discloses a removable light attached to a pencil. Brill has a light shining onto table utensils. Nishizawa, et al. disclose in FIG. 2(b) VELCRO® fastening of a tool illuminating device for a key or other tool. McIntosh shows an illuminated multi-tool including a bottle opener. Hoover shows a lighted pocket knife. Rubalcava discloses a waiter's wine and bottle opener attached to a cigarette lighter. Schnell shows a multi tool and a flashlight. The Nonteen website shows an illuminated bottle opener. The SwissCard device is an illuminated tool holder.

It is therefore an object of the invention to provide an attachment for cell phones to provide the user with additional convenience.

It is another object of the invention to provide a cell phone attachment which includes an illuminating light and a bottle opener.

It is another object of the invention to provide an attachment of the class described where the light is removable from the attachment.

DETAILED DESCRIPTION OF THE PREFERRED EMBODIMENT

Figure 1:
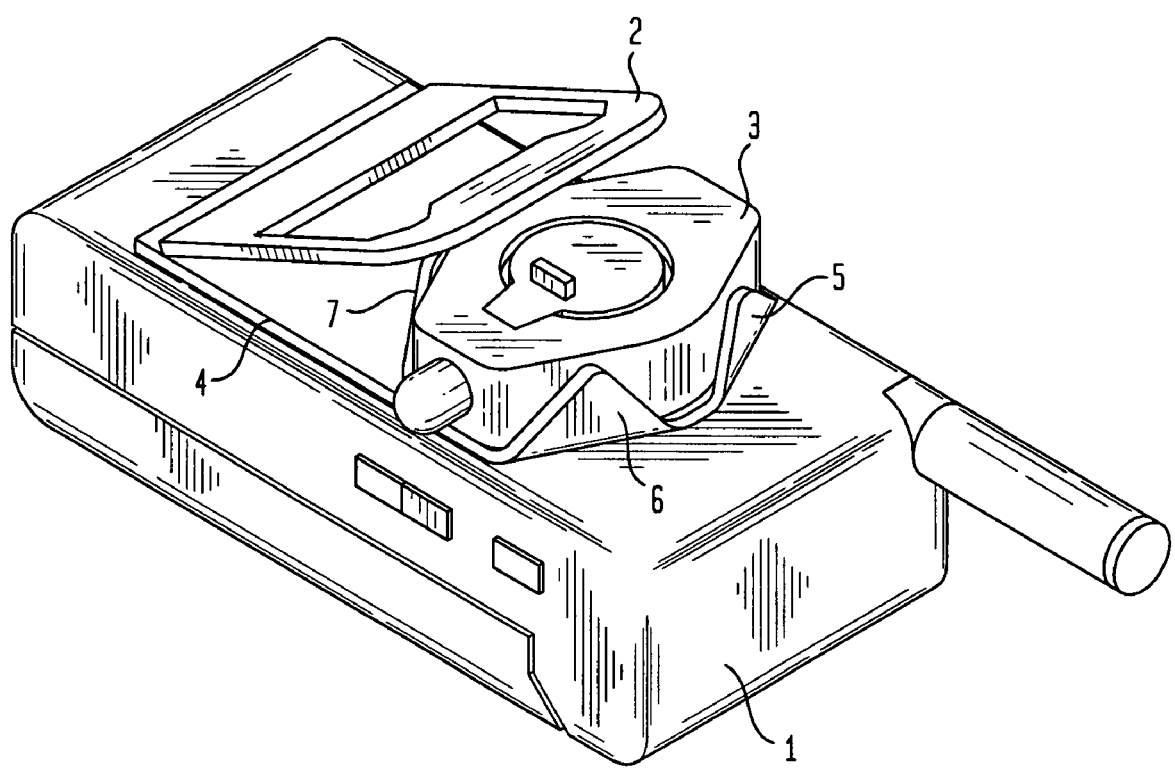
FIG. 1 is a perspective view of a cell phone with the assembly of the invention attached thereto.
Figure 2:
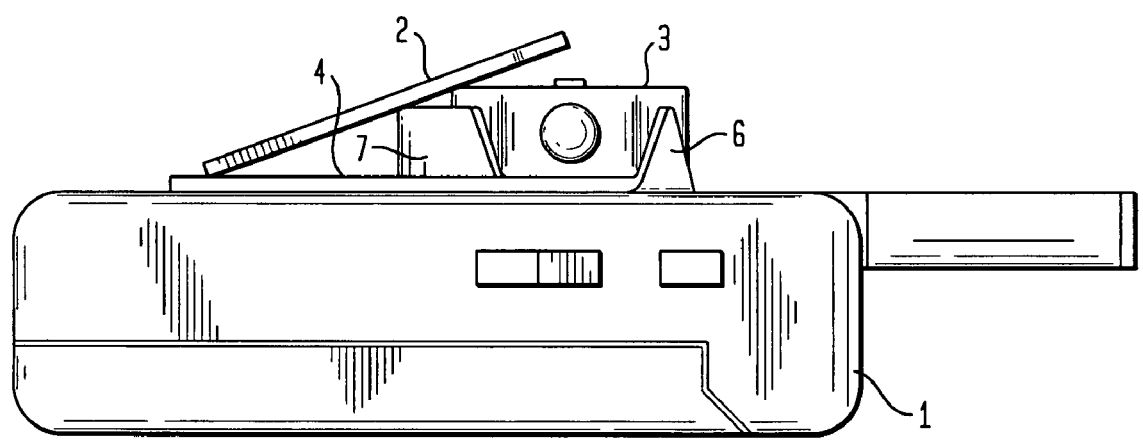
FIG. 2 is a side view of the invention shown in FIG. 1.

As shown in FIGS. 1-2, a cellular telephone 1 has the invention attached to the back of the phone. The invention includes a mounting plate 4 having two elevated support end portions 5 and 6 formed at one end thereof and a wall portion 7 formed intermediate of the ends of the plate. The plate 4 has a bottle opener 2 fixedly mounted thereon. The light 3 is preferably a small battery operated high intensity light. It is removably held in place by friction fit between walls 5, 6, and 7 and also by a portion of bottle opener 2.

The plate 4 may be permanently attached to the phone as by adhesive, or removably attached via hook and pile VELCRO® fasteners, for example. In this construction, the hook fasteners are attached to the back of the phone so and the pile fasteners attached to the back of mounting plate 4.

Figure 3:
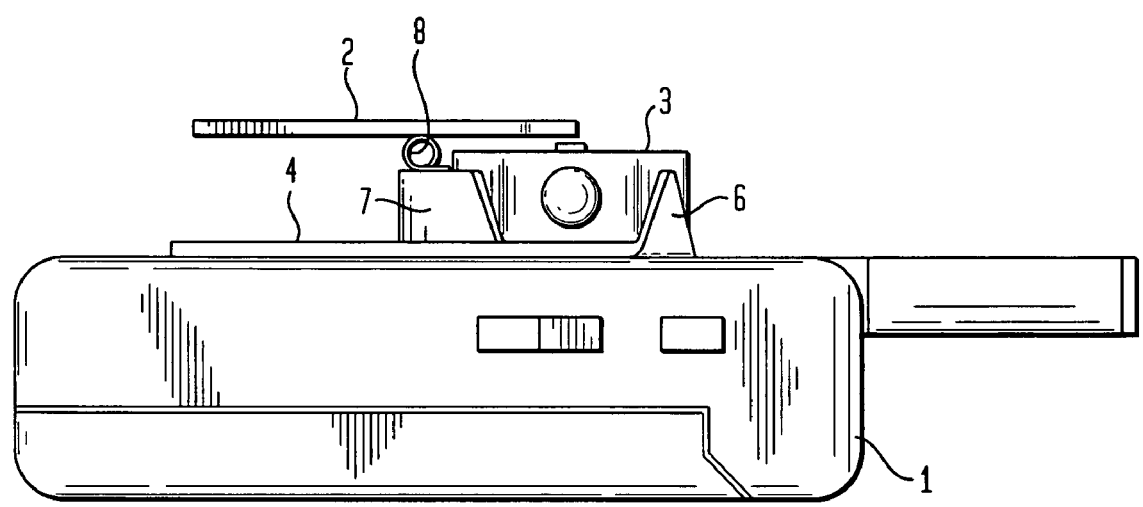
FIG. 3 is a side view of another embodiment of the invention.

FIG. 3 is another embodiment of the invention. In this embodiment a spring 8 if inserted between the bottle opener and the top of supporting wall 7. This allows the bottle opener to also function as a belt clip for the cell phone and the attachment against the force of spring 8 which urges the bottle opener from the position shown in FIG. 3 to the position shown in FIGS. 1-2. An additional fastening (not shown) may be provided to securely hold the end of the bottle opener against the plate 4.

Further modifications to the methods and apparatus of the invention may be made without departing from the spirit and scope of the invention.

I claim:

1. An attachment for a cellular telephone comprising:
    a mounting plate,
    a light removably attached to said mounting plate;
    a bottle opener pivotally mounted on said mounting plate; and
    at least two walls formed on said mounting plate for frictionally supporting said light on said mounting plate,
    wherein a portion of said bottle opener is resiliently placed onto said light to hold said light onto said mounting plate.

2. A multi-function attachment comprising, a mounting plate; a light removably attached to said mounting plate; and spring loaded pivotally mounted bottle opener means affixed to said mounting plate for pivoting into and out of engagement with said light to directly contact said light to hold said light onto said mounting plate in a first pivoted position and to clip said attachment to a user in a second pivoted position.

3. The multi-function attachment of claim 2 further including at least two wall portions formed on said mounting plate for frictionally holding said light on said mounting plate.

4. The multi-attachment of claim 3 wherein said bottle opener is mounted on the top of one of said wall portions.

5. The multi-function attachment of claim 3 further including means attached to said mounting plate for removably attaching said plate to a cellular telephone or to a cellular telephone case.

* * * * *